(No Model.)
J. A. PANTON.
LEATHER WORKING MACHINE.
No. 305,532. Patented Sept. 23, 1884.
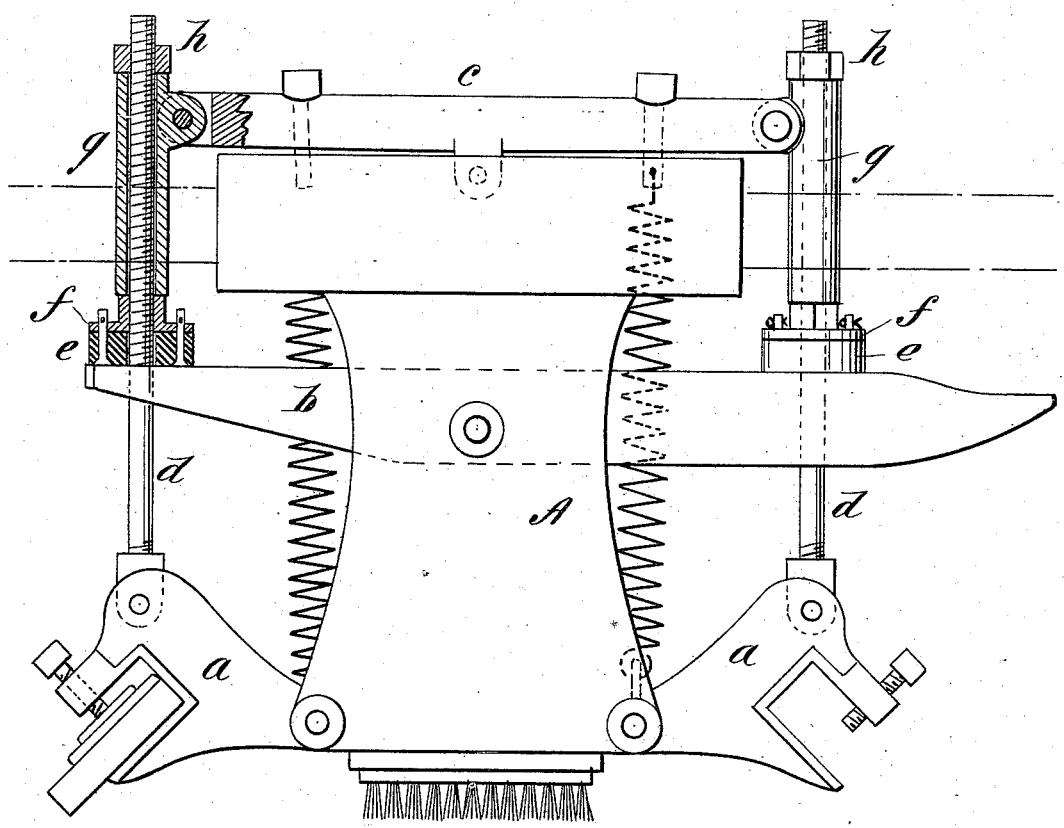
WITNESSES:
Dom Twitchell
C. Sedgwick
INVENTOR:
J. A. Panton
BY Munn
ATTORNEYS.

UNITED STATES PATENT OFFICE.

JOHN A. PANTON, OF QUINCY, MASSACHUSETTS.

LEATHER-WORKING MACHINE.

SPECIFICATION forming part of Letters Patent No. 305,532, dated September 23, 1884.

Application filed July 30, 1884. (No model.)

*To all whom it may concern:*

Be it known that I, JOHN A. PANTON, of Quincy, in the county of Norfolk and State of Massachusetts, have invented a new and Improved Leather-Working Machine, of which the following is a full, clear, and exact description.

My improvements relate to the Fitzhenry and the Holmes leather-working machines, and have the object to allow more convenient setting and adjustment of the machine, and to strengthen certain parts, as hereinafter described and claimed.

Reference is to be had to the accompanying drawing, forming part of this specification, in which the reciprocating carriage of a leather-working machine is shown with my improvements.

The carriage A, hinged tool-holders $a$, oscillator $b$, top lever, $c$, pivoted on the carriage, tool-rods $d$ $d$, connecting the lever and tool, the rubber cushions $e$, and flanged nuts $f$, are of the usual construction. Heretofore the rods $d$ have been connected to lever $c$ by means of short sleeves pivoted to the lever, the rods passing through the sleeves with nuts above and below, and the flanged nuts $f$ and cushions $e$ were held by set-nuts on the rods $d$. The nuts $f$ were liable to become loose by jar of the machine, and, as heretofore held, it was inconvenient to adjust and tighten these parts, besides requiring a special form of wrench. In my improved construction I make use of the long sleeves $g$, pivoted to lever $c$, and extending on the rods $d$ to the flanged nuts $f$, so that the single nuts $h$ on the rods $d$ above the sleeve hold the parts firmly down and allow all necessary adjustment. The sleeves $g$ serve to strengthen the rods, so that there is no risk of their being bent or broken. They also prevent the flanged nut and cushion from becoming loose and out of place, and, the adjusting-nuts being at the top and readily accessible, an ordinary wrench can be used. This construction does away with the counting of threads heretofore necessary in adjusting the parts, as they all come to their proper place.

Having thus described my invention, I claim as new and desire to secure by Letters Patent—

1. In a leather-working machine, the combination, with suitable supports, of the long sleeve $g$, nuts $h$, the tool-rods $d$, nuts $f$, and cushions $e$, substantially as set forth.

2. In leather-working machines, the combination of sleeves $g$, tool-rods $d$, and the nuts $h$ $f$ with the top lever, $c$, and oscillator $b$, substantially as described.

JOHN A. PANTON.

Witnesses:
WILLIAM MACFARLAND,
WM. PANTON.